M. CRAIG.
AUXILIARY AIR VALVE FOR MOTORS.
APPLICATION FILED DEC. 6, 1920.
1,411,957.
Patented Apr. 4, 1922.
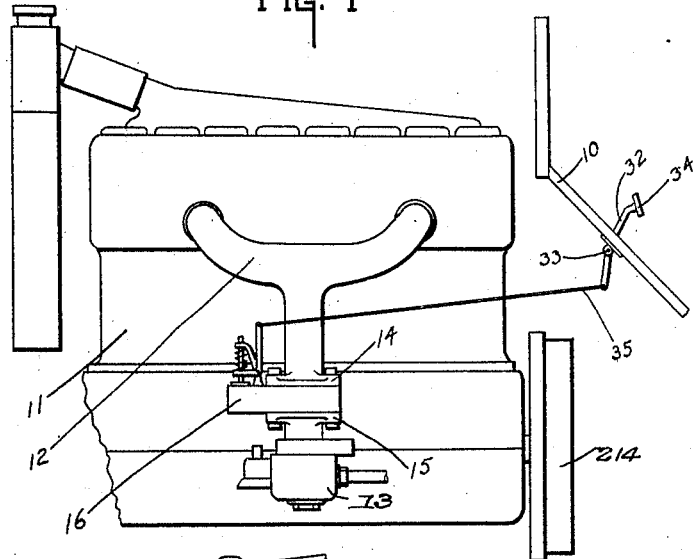
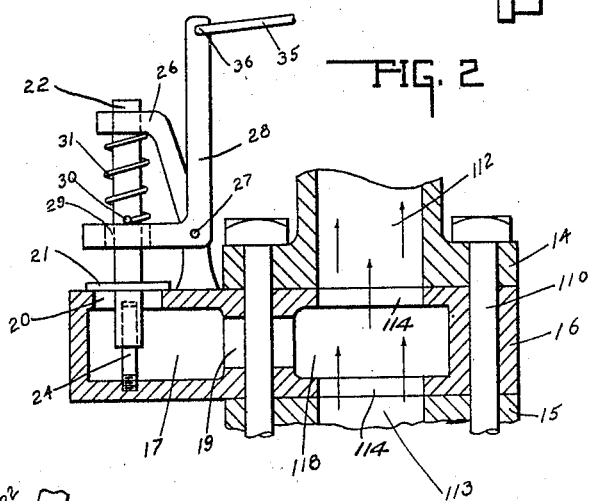
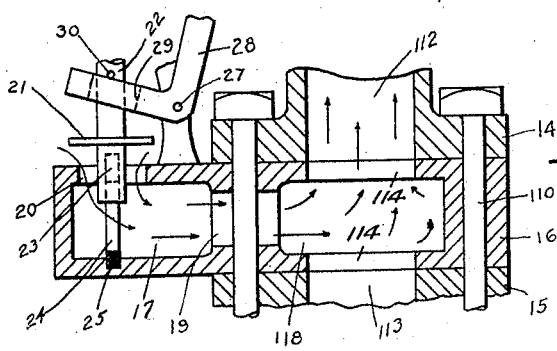
INVENTOR.
MANCIS CRAIG.
BY
ATTORNEYS.

UNITED STATES PATENT OFFICE.

MANCIS CRAIG, OF BEDFORD, INDIANA.

AUXILIARY AIR VALVE FOR MOTORS.

1,411,957.    Specification of Letters Patent.    Patented Apr. 4, 1922.

Application filed December 6, 1920. Serial No. 428,668.

*To all whom it may concern:*

Be it known that I, MANCIS CRAIG, a citizen of the United States, and a resident of Bedford, county of Lawrence, and State of Indiana, have invented a certain new and useful Auxiliary Air Valve for Motors; and I do hereby declare that the following is a full, clear, and exact description thereof, reference being had to the accompanying drawings, in which like numerals refer to like parts.

This invention relates to motor vehicles, and in particular to motor vehicles equipped with an internal combustion engine.

The chief object of this invention is to provide an internal combustion engine of a motor vehicle with an air supplying device independent of the usual fuel or carbureting device, whereby air may be supplied to the internal combustion engine and act as a brake for the motor vehicle, as well as a scavenger and carbon remover.

One feature of the invention consists in the positioning of said auxiliary air supplying means intermediate the usual carbureter and intake manifold or intake of the engine.

Another feature of the invention is that the same may be used as a priming device when desired; and in ordinary operation, said device is adapted to clean the engine cylinders by burning out the carbon, and is also adapted to cool said cylinders.

Another feature of the invention is that the same not only reduces the use of fuel when the device is operative, but also reduces the use of the lubricant in said engine by destroying the vacuum in the engine manifold.

Another feature of the invention is that the same is suitably connected so that the device may be operated by suitable means positioned in the driver's compartment of the motor vehicle, such as by a pedal positioned on the toe board thereof, thus permitting the device to be operated as a brake without the necessity of operating the usual clutch and brake means of the motor.

The full nature of the invention will be understood from the accompanying drawings and the following description and claim.

In the drawings, Fig. 1 is a side elevational view of an internal combustion engine, a carbureter, the dash, the toe board of the motor vehicle, and the device associated with the same. Fig. 2 is an enlarged central sectional view of the invention showing the same in the closed position. Fig. 3 is a view similar to Fig. 2 and shows said parts in the open or operative position.

In the drawings 10 indicates the toe board of a motor vehicle supplied with an internal combustion engine 11, the same being equipped with an intake manifold 12. Communicating with the intake manifold 12 is the usual carbureter means 13, said manifold and said carbureter being provided with the complementarily formed flanges 14 and 15 respectively. The invention in Fig. 1 is indicated by the numeral 16, and said invention comprises a housing member provided with two chambers 17 and 118 and a communicating passage 19 therebetween. The chamber 118 communicates with the intake manifold 112 and the carbureter passage 113 by means of the registering openings 114. Thus, the casing or housing 16 is adapted to provide an unobstructed passage from the carbureter passage 113 to the intake manifold passage 112. The flow of gases normally is in the direction shown by the arrows in Fig. 2.

In the chamber 17 there is provided an opening 20 which is adapted to communicate with the atmosphere. Positioned adjacent the opening 20 is a valve closure plate 21 provided with a stem 22 which extends in both directions from said plate. The inwardly extending end which normally projects into the chamber 17 is suitably recessed to provide an opening 23. Adjacent the opening 20 and positioned concentrically within the same is a stem or guide member 24 having a threaded engagement 25 with the opposite wall of the chamber 17. The guide member 24 terminates within the casing 17, as shown in Fig. 2, and is adapted to be received by the recess 23. Thus, the guide member 24 slidably supports the valve stem 22 and guides the same so that said valve will be seated upon the casing 16 to close the opening 20 when actuated by suitable means. Projecting upwardly from the casing 16 is an overhanging bracket or arm 26 which slidably supports the other end of the valve stem 22, as shown clearly in Fig. 2. Pivotally supported at 27 upon the bracket 26 is a bell crank lever 28, one end of which is suitably slotted, as at 29, and through which extends the valve stem 22. A pin member 30 extends transversely of the valve stem member 22, and said slotted bell crank end is adapted to engage the pin member 30 to elevate said valve stem and the valve 21 from its seat. Positioned between the slidable supporting portion of the bracket 26 and the slotted portion of the bell crank lever 28 and concentric with said valve stem 22 is a coiled spring 31 which normally tends to maintain the valve 21 upon its seat to close the opening 20.

The means for operating, tilting or rocking the bell crank lever 28 comprises a lever 32 pivotally supported upon the chassis, toe board or other portion of the motor vehicle at 33. Upon the upwardly extending portion of the lever 32 is secured a suitable foot pedal or rest member 34. Upon the opposite end of the lever 33 there is secured a rod member 35, the other end of which is connected at 36 to the free end of the bell crank lever 28. Thus, when the foot pedal 34 is depressed, the lever 32 is rocked upon the pivot 33, which in turn through the rod member 35 tilts the lever 28 upon its pivot 27 to elevate the valve 21 from its seat adjacent the opening 20. Thus, air is admitted to the casing 16, and by means of the chamber 17, passage 19 and chamber 18, said air enters the manifold passage 12. As shown clearly in the drawings, the bolt members 110 are adapted to extend from the flange 14 to and through the flange 15 and simultaneously secure the carbureter to the manifold, and the air valve casing 16 in registrable relation therewith.

In Fig. 3 the arrows indicate the passage of the air from the atmosphere through the valve 20 to the intake manifold passage 112 through the chambers 117 and 118 and the communicating passageway 19. It will be understood that in view of the relatively direct connection between the atmosphere and the passage 112 through the port 20 that when said port is open, the engine will draw air through the atmosphere rather than draw air through the carbureter because of the decreased resistance in the passageway from the atmosphere through the port 20. In this manner opening of the valve 20 substantially chokes or cuts off the fuel supplied to the engine such that said engine in its continued operation will function as an air compressor, instead of as an internal combustion engine, said engine deriving its power to compress air from the power stored in the fly wheel 214. When braking action is desired, the fuel supply is cut off. Each engine cylinder when the valve 20 is open receives a charge of air in the usual manner and compresses the same upon the compression stroke and maintains said compression during the firing stroke until the same is exhausted, all as in the usual manner, with this exception, the highly compressed air in each cylinder is adapted to unite with the uncombined carbon in said cylinder and burn the same, thereby scavenging or cleaning said cylinder. Continued operation of the engine will thereafter draw cool air into each of the cylinders and cool the walls thereof, as well as the piston and mechanically remove the loose carbon.

In view of the compressor action which, as described, takes the stored power from the fly wheel, and, therefore, slows down the driving mechanism, it will be understood that opening the valve 20 is equivalent to applying the brakes to the vehicle, excepting in the present instance the retardation is applied through the driving mechanism instead of through the brake means. In addition to the foregoing, the casing 16 is so constructed that the same is adapted to function as a primer for the motor vehicle when the priming fluid is injected through the opening 20 into the chamber 17 where the same vaporizes and passes into the intake manifold or intake and thereafter is supplied to the engine cylinders.

The invention claimed is:

An auxiliary air device for an internal combustion engine including a casing interposed in the intake thereof and provided with a passage therethrough adapted to register with said intake, said casing including a chamber communicating with said registering passageway and provided with a port opening therein communicating with the atmosphere, a valve for controlling said port opening, a bracket on said casing projecting therefrom, a stem associated with said valve and slidably supported in said bracket, yielding means interposed between said bracket and the casing and associated with said stem for normally maintaining the valve in closed position upon the opening, a lever pivotally supported on said bracket and engaging said stem for actuating the same and compressing said yielding means, and a guide within the opening and extending from the opposite side for slidably supporting the stem thereon.

In witness whereof, I have hereunto affixed my signature.

MANCIS CRAIG.